Feb. 29, 1944.  L. A. MAJNERI  2,342,878
PRESSURE CONTROL DEVICE
Filed July 22, 1942  2 Sheets-Sheet 2
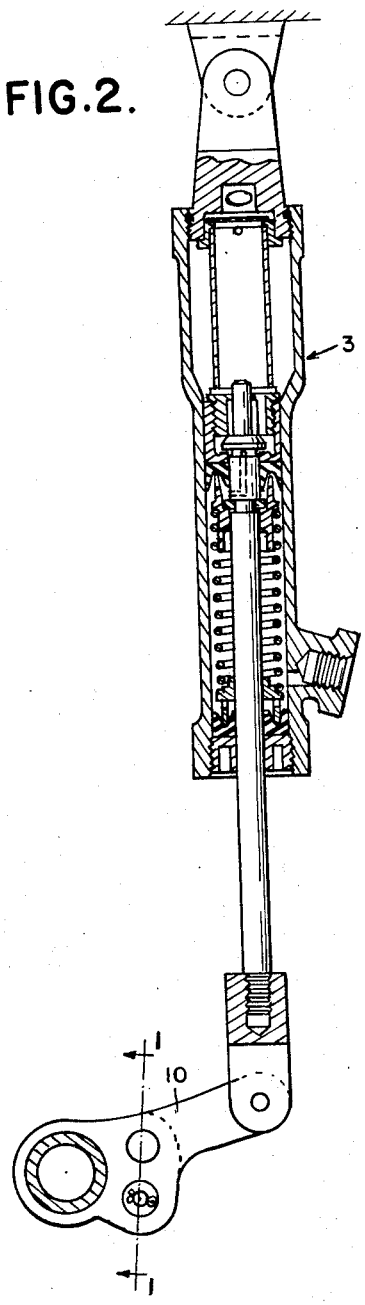
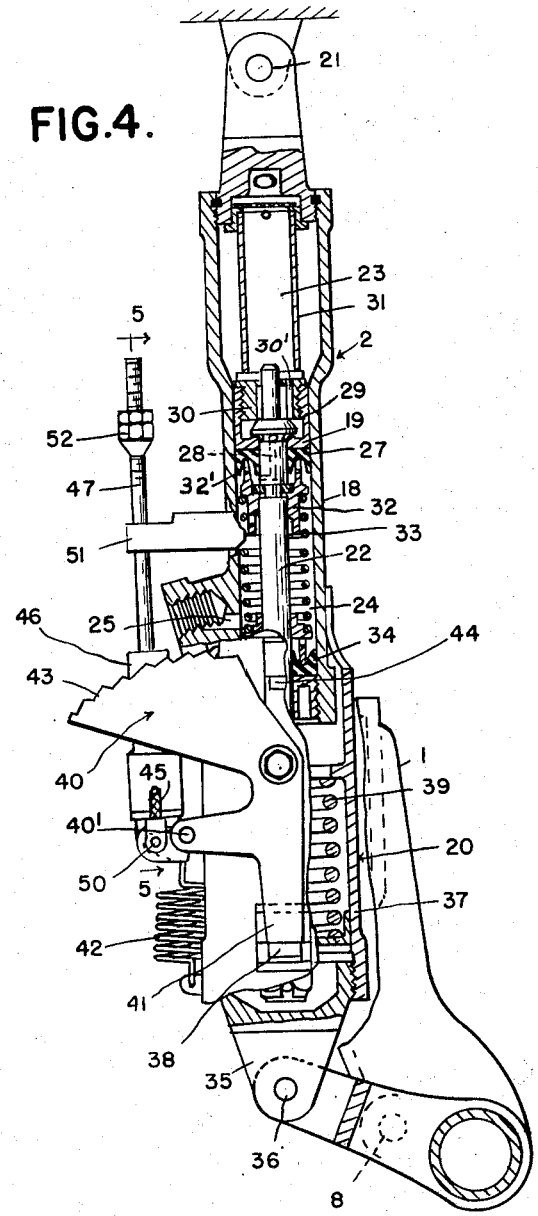
INVENTOR.
LUDWIG A. MAJNERI
BY
ATTORNEYS Patented Feb. 29, 1944

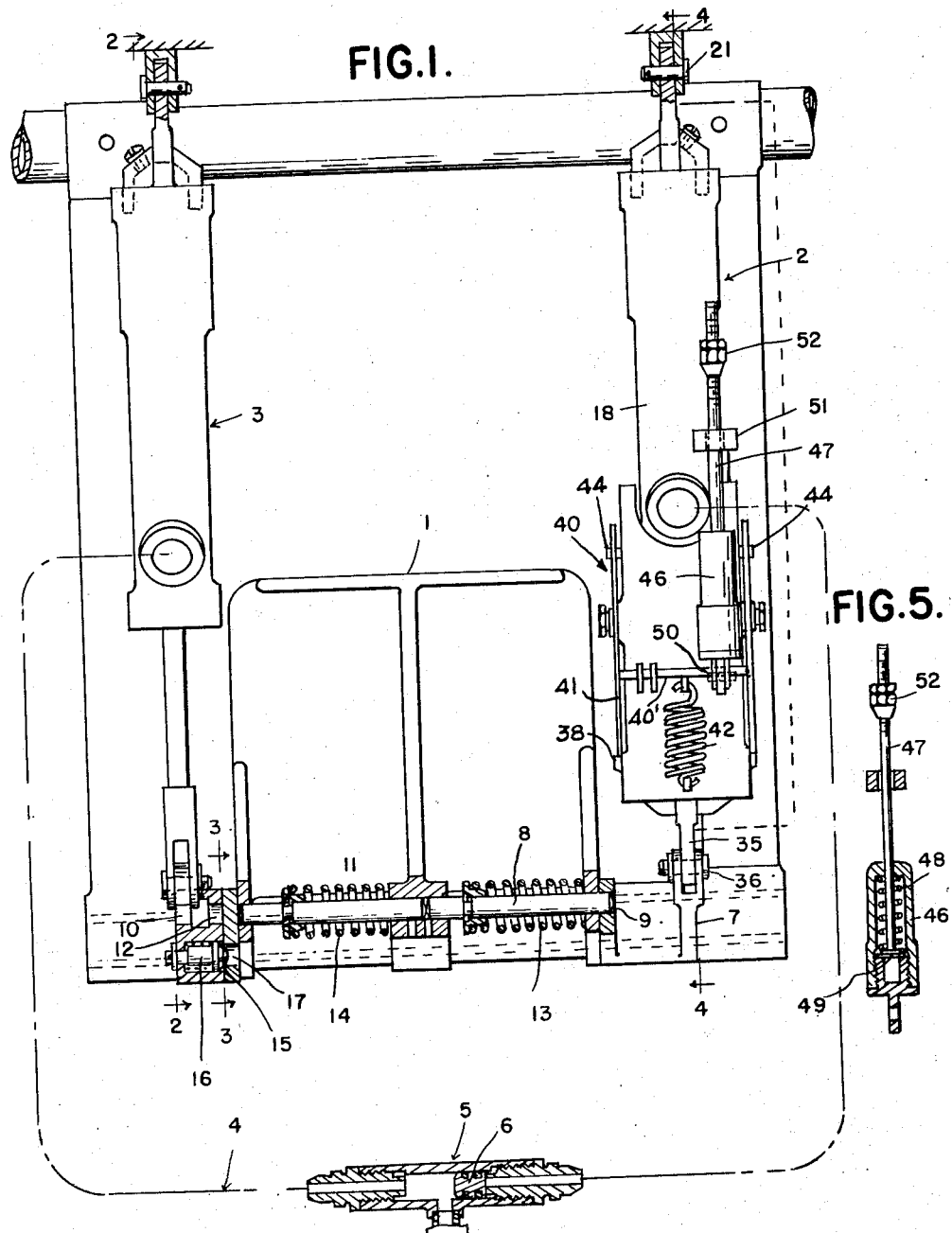

2,342,878

UNITED STATES PATENT OFFICE 2,342,878

PRESSURE CONTROL DEVICE

Ludwig A. Majneri, Grosse Pointe, Mich., assignor to The Warner Aircraft Corporation, Detroit, Mich., a corporation of Michigan Application July 22, 1942, Serial No. 451,913

5 Claims. (Cl. 60—54.6)

The invention relates to brake systems and refers more particularly to pressure control devices for use in brake systems equipped for emergency braking.

The invention is particularly applicable to a hydraulic brake system having a service pressure control device provided with a yieldable parking mechanism and an emergency pressure control device in which the two devices are adapted to be operated separately by the same mannually operable member.

The invention has for one of its objects to provide the pressure control device having the yieldable parking mechanism with an automatic release mechanism for the parking mechanism which is operable when the pressure control device becomes inoperative.

The invention has for another object to so construct the automatic release mechanism that it permits the advance of the piston of the pressure control device through its complete normal operating range when the pressure control device is operative without releasing the parking mechanism.

With these and other objects in view, the invention resides in the novel features of construction and combinations and arrangements of parts, as more fully hereinafter set forth.

Figure 1 is a front elevation, partly in section, on the line 1—1 of Figure 2 of the braking liquid pressure producing portion of the brake system, and a diagrammatic view of the remaining portion of the brake system;

Figures 2 and 3 are cross sections on the lines 2—2 and 3—3, respectively, of Figure 1;

Figure 4 is a cross section on the line 4—4 of Figure 1, partly broken away;

Figure 5 is a cross section on the line 5—5 of Figure 4.

While the pressure control device embodying the automatic release mechanism may have a number of uses, it is particularly applicable to the hydraulic brake system illustrated and described in the pending patent application to L. A. Majneri and W. A. Wiseman, Serial No. 451,-912, on Brake system.

In general, the brake system comprises the foot pedal 1, the service pressure control device 2, and the emergency pressure control device 3, each of which devices has an outlet port connected to the pressure line 4 leading to the wheel cylinder of the brake. The pressure line includes the shuttle valve 5 having a piston 6 movable to positions at the ends of its stroke for placing either pressure control device in communication with the wheel cylinder.

The foot pedal is adapted to be operatively connected to the service pressure control device by the actuating lever 7 and the pin 8, the actuating lever having its free end pivoted to the lower fitting of the service pressure control device and being provided with the hole 9 for receiving the pin 8. The foot pedal is also adapted to be operatively connected to the emergency pressure control device 3 by the actuating lever 10 and the pin 11, the actuating lever having its free end pivoted to the piston rod of the emergency pressure control device and being provided with the hole 12 for receiving the pin 11. The pins are slidably carried by the foot pedal and are in axial alignment and abut each other. The coil spring 13 resiliently urges the pin 8 away from the actuating lever 7 and the coil spring 14 resiliently urges the pin 11 toward the actuating lever 10. To hold the pin 8 in the hole 9 of the actuating lever 7 and to hold the pin 11 away from the actuating lever 10, there is the index plate 15 resiliently positioned relative to the actuating lever 10 by the spring pressed lock pin 16 to locate the hole 17 in the index plate beyond the normal operating advance or forward movement of the foot pedal 1. This advance corresponds to the advance of the piston of the service pressure control device 2 through its normal operating range when the device is operative to apply the brakes. When the service pressure control device becomes inoperative as by reason of loss of braking liquid in the device or in the pressure line, the piston of the device is advanced beyond its normal operating range by the foot pedal until a point is reached during this additional advance of the foot pedal such that the pin 11 enters the hole 17 in the index plate. Then when the foot pedal is allowed to return to its original or off position, the pin 11 moves into the hole 12 of the actuating lever 10. During this return, the friction between the pin 8 and the actuating lever 7 decreases to a point such that the spring 13 overcomes the friction and moves the pin 8 out of the hole 9 of the actuating lever 7.

At this time, the connection between the foot pedal 1 and the service pressure control device 2 is broken and the connection between the foot pedal 1 and the emergency pressure control device 3 is made so that upon again advancing the foot pedal by swinging the same forwardly, the emergency pressure control device is operated to apply the brake.

The service pressure control device 2 is of standard construction and of the extension type employing yieldable parking mechanism and is generally similar to that disclosed in the L. A. Majneri Patent No. 2,120,073, patented June 7, 1938 and also to that disclosed in the L. A. Majneri Patent No. 2,115,174, patented April 26, 1938. The device comprises the cylinder 18, the piston 19 and the yieldable parking mechanism 20 which is normally inoperative but can be manually made operative to yieldably apply the braking pressure through the piston.

The cylinder has at its upper end a vented upper fitting which is pivotally connected to the airplane by the pin 21 and the cylinder has at its lower end a plug formed with an axial bore through which extends the piston rod 22. The piston 19 is slidably secured to the upper end of the piston rod 22 and forms a common wall for a reserve chamber 23 in the upper portion of the cylinder and a pressure chamber 24 in the lower portion of the cylinder. The cylinder is formed with the port 25, opening into the pressure chamber and connected to the pressure line 4.

The piston 19 has the upwardly facing cup-shaped body 26 and the downwardly facing sealing cup 27, the webs of which normally abut. The piston rod 22 is provided with the by-pass 28 which provides for the passage of the braking liquid past the piston 19. The piston rod is also provided with the integral valve 29 above the by-pass and adapted to seat on the web of the piston body.

30 is a downwardly facing cup-shaped nut threaded into the piston body and having the lower end of its side wall engageable with the valve 29 when the latter is raised off the web of the piston body. The upward movement of the piston is limited by the spacer 31 located in the reserve chamber 23 and when the parts are in their off position with the piston in its uppermost position, the by-pass 28 opens into the reserve chamber 23 and the pressure chamber 24, the web of the nut 30 being provided with suitable apertures 30'. However, upon downward movement of the piston rod relative to the piston, communication is closed. To overcome possible sticking of the sealing cup 27 with the wall of the pressure chamber 24, during retraction of the piston 19 to its off position, there is the cup-shaped retainer 32 secured to the piston rod 22 and having its upper end engageable with the web of the sealing cup. The upper end of the retainer is provided with suitable radial grooves 32' to secure a continuous communication between the reserve and pressure chambers when the parts are in their off position.

To retain the piston 19 and the piston rod 22 in their off positions, there is the return coil spring 33 abutting the sealing cup 34 in the lower end of the pressure chamber and the retainer 32. The spring acts through the retainer upon the piston rod, which in turn acts upon the piston through the valve abutting the nut.

The yieldable parking mechanism 20 as shown has at its lower end the lower fitting 35 which is pivotally connected by the pin 36 to the actuating lever 7. The lower fitting is secured to the lower end of the housing 37 having an axial hole in its top through which the piston rod 22 extends. 38 is a yoke sleeved on the lower end of the piston rod and held in place by a nut threaded on the lower end of the piston rod. The yoke extends through diametrically opposite slots in the housing 37. 39 is a parking coil spring within the housing and abutting its top and the yoke. To control the operation of the parking mechanism, there is a ratchet comprising like plates 40 pivotally mounted on the housing 37 at opposite sides thereof and connected by the bar 40' to swing in unison. The plates have the depending arms 41 adapted to abut the end portions of the yoke extending beyond the housing. The arms are normally held in engagement with the yoke by the ratchet return coil spring 42. The plates are formed with the upwardly extending teeth 43 which are engageable with the lugs 44 on the cylinder 18 when the ratchet has been swung by the cable 45 from its normal position. The arrangement is such that with the ratchet in its normal position, at which time the arms 41 abut the yoke 38, downward pull on the lower fitting 35 to extend the service pressure control device and force braking liquid to the wheel cylinder causes downward movement of the piston 19 through the ratchet independently of the parking spring 39. However, if the ratchet is swung from its normal position to release the parking spring, downward pull on the lower fitting causes the parking spring to move the piston downwardly. If the ratchet is then swung to engage its teeth 43 with the lugs 44, the housing 37 will be positively held in a lowered position with respect to the cylinder 18 and the parking spring 39 will resiliently hold the piston 19 downwardly to maintain pressure upon the braking liquid in the pressure chamber 29 and the pressure line 4.

With the construction of service pressure control device as thus far described, its piston is reciprocable through a normal operating range independently of the parking spring to apply braking pressure when the device is operative. This range is such that the index plate 15 prevents the automatic operation of the pins 8 and 11.

In the event that the service pressure control device becomes inoperative to develop pressure, as by reason of a leak in the pressure line or the device, it is necessary in order to provide for the automatic operation of the pins 8 and 11 to provide automatic release mechanism for the parking mechanism so that it can yield. The automatic release mechanism comprises the housing 46, the rod 47 extending axially into the housing through its upper end, and the coil spring 48 in the housing and located between its upper end and the head 49 fixedly secured to the lower end of the rod 47. The housing is pivotally connected at its lower end by the pin 50 to the ratchet and the rod 47 extends slidably through the lateral arm 51 secured to the cylinder 18. The coil spring 48 is stronger than the ratchet release coil spring 42. 52 is a nut adjustably threaded on the rod 47 above the lateral arm 51 and adapted during the extension of the service pressure control device by the actuating lever 7 to contact the lateral arm 51 shortly before the travel of the piston of the service pressure control device through its normal operating range independent of the parking spring has been completed. If the service pressure control device is operative to develop pressure so that there is hydraulic pressure in the brake system, a load is transmitted between the parking spring yoke 38 and the arms 41 of the ratchet creating friction between the yoke and the arms tending to hold the arms in contact with the yoke to prevent the parking spring 39 from deflection. However, the complete piston travel through its normal operating range independent of the parking spring still can be obtained because of the deflection of the coil spring 48 since the friction between the yoke and the arms is sufficient to hold the arms in contact with the yoke. If the service pressure control device becomes inoperative to develop pressure and there is no hydraulic pressure in the brake system during the extension of the service pressure control device, the friction between the yoke and the arms becomes very small and allows the ratchet release mechanism to swing the ratchet to disengage the arms 41 from the yoke 38 when the piston travel through its normal range independent of the parking spring has been completed. As a result, during continued extension of the service pressure control device, the parking spring 39 is deflected.

The extension of the service pressure control device being effected by the foot pedal 1 through the pin 8 and the actuating lever 7, it will be seen that the deflection of the parking spring 39 in the service pressure control device, which provides for the full extension of the service pressure control device, permits the foot pedal to swing far enough to register the pin 11 with the hole 17 in the ratchet plate 15 at substantially the end of the full extension of the pressure control device. The pilot then allows the foot pedal to be returned to its off position by the parking spring 39 and the return spring 33 which causes the pin 11 to swing the index plate to register its hole 17 with the hole 12 in the actuating lever 10 after which the pin 11 is forced by its spring 14 into the hole 12. At the same time, during the return, the pressure of the parking spring 39 is first removed and then the pressure of the return spring 33 is decreased until a point is reached when the strength of the coil spring 13 is sufficient to move the pin 8 out of the hole 9 in the actuating lever 7. Therefore, at the end of the return stroke of the foot pedal, a connection between the foot pedal and the emergency control device has been made. As a result forward movement of the foot pedal to apply the brake results in the extension of the emergency pressure control device only.

What I claim as my invention is:

1. In a pressure control device, the combination with a cylinder, a piston slidable within said cylinder, yieldable parking mechanism operatively connected to said piston and means normally holding said parking mechanism out of operation during advance of said piston through a normal operating range when the device is operative to develop pressure, of an automatic mechanism for releasing said means during the advance of said piston through the normal operating range when the device is inoperative to develop pressure to permit said parking mechanism to yield.

2. In a pressure control device, the combination with a cylinder, a piston slidable within said cylinder, a parking spring operatively connected to said piston and means normally holding said parking spring out of operation during advance of said piston through a normal operating range when the device is operative to develop pressure, of an automatic mechanism for releasing said means during the advance of said piston through the normal operating range when the device is inoperative to develop pressure to permit said parking spring to deflect.

3. In a pressure control device, the combination with a cylinder, a piston slidable within said cylinder, a piston rod, parking mechanism for advancing said piston comprising a housing and a parking spring within said housing and operatively connected to said piston rod, and a ratchet on said housing normally operatively connected to said piston rod to hold said parking spring out of operation during the advance of said piston through a normal operating range when the device is operative to develop pressure, of an automatic mechanism between said cylinder and ratchet for releasing said ratchet from said piston rod during the advance of said piston through the normal operating range when the device is inoperative to develop pressure to permit said parking spring to deflect during the continued advance of said piston said automatic mechanism being dependent for its operation upon the friction created in the operative connection between said ratchet and piston rod.

4. In a pressure control device, the combination with a cylinder, a piston slidable within said cylinder, yieldable parking mechanism operatively connected to said piston and means comprising a spring and members in frictional engagement with each other normally holding said parking mechanism out of operation during the advance of said piston through a normal operating range when the device is operative to develop pressure, of an automatic mechanism between said cylinder and means for releasing the latter during the advance of said piston through the normal operating range when the device is inoperative to develop pressure, said automatic mechanism comprising members movable relative to each other, and a spring of greater strength than said first mentioned spring normally holding said last mentioned members in predetermined relation to each other, the friction between said first mentioned members being greater when the device is operative to develop pressure than when the device is inoperative to develop pressure and controlling the operation of said automatic mechanism.

5. In a pressure control device, the combination with a cylinder, a piston slidable within said cylinder, a piston rod, an abutment on said piston rod, parking mechanism for advancing said piston comprising a housing, and a parking spring within said housing and operatively connected to said piston rod by means of said abutment, a ratchet on said housing normally engaging said abutment to hold said parking spring out of operation during the advance of said piston through a normal operating range when the device is operative to develop pressure, and a spring connected to said ratchet for normally holding the same in engagement with said abutment, of an automatic mechanism between said cylinder and ratchet for releasing said ratchet from said piston rod during the advance of said piston through the normal operating range when the device is inoperative to develop pressure, said mechanism comprising a housing connected to said ratchet, a rod extending within said housing and having an abutment adapted to be limited by said cylinder and a spring within said housing for normally holding said housing and rod in a predetermined relation, said last mentioned spring being stronger than said first mentioned spring, the friction between said ratchet and abutment being greater when said device is operative to develop pressure than when said device is inoperative to develop pressure and controlling the operation of said automatic mechanism.

LUDWIG A. MAJNERI.